Nov. 30, 1965     E. E. GOODALE ETAL     3,221,165
DEVICE FOR MEASURING BIOLOGICAL EFFECT OF RADIATION
Filed March 6, 1961
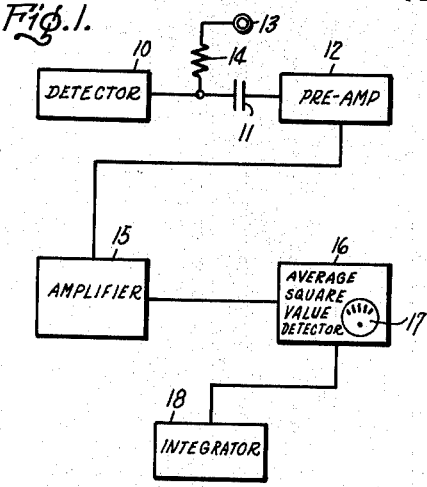
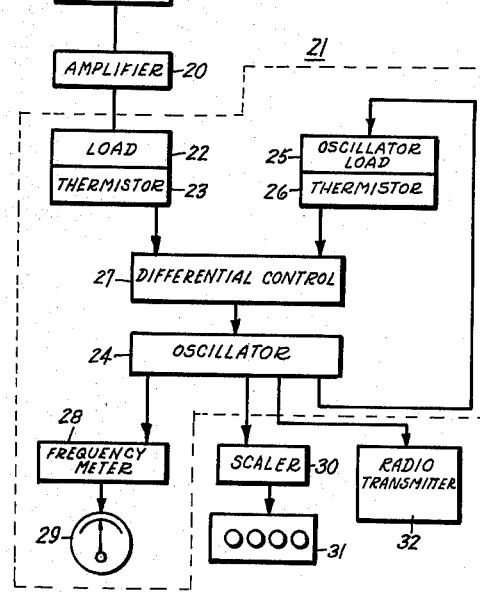
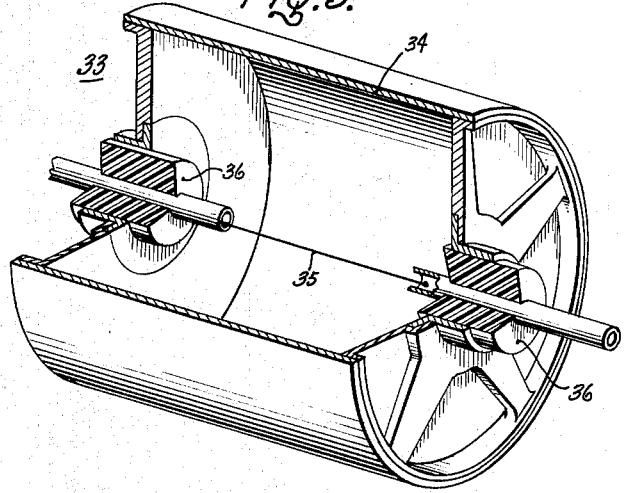
Inventors
Robert S. Rochlin
Victor V. Verbinski
Edmund E. Goodale
by Paul A. Frank
Their Attorney United States Patent Office 3,221,165
Patented Nov. 30, 1965

3,221,165
DEVICE FOR MEASURING BIOLOGICAL EFFECT OF RADIATION
Edmund E. Goodale, Scotia, and Robert S. Rochlin, Schenectady, N.Y., and Victor V. Verbinski, Oak Ridge, Tenn., assignors to General Electric Company, a corporation of New York
Filed Mar. 6, 1961, Ser. No. 93,771
7 Claims. (Cl. 250—83.6)

This invention relates to radiation detection devices and, more particularly, to such a device which will measure the biological effect of detected radiation.

The recently discovered high intensity belts of ionizing radiation around the earth have serious implications for space flight. It is important to install in manned space vehicles appropriate radiation monitoring equipment to indicate the dose received if the vehicle should pass through a radiation zone, either by design or by accident.

The radiation in the belts is now believed to contain both protons and electrons. No radiation monitoring equipment has previously been known which can correctly measure the biological effect of both proton and electron radiation simultaneously. In addition to protons and electrons, there are many other types of ionizing radiation, such as alpha particles, neutrons, and high energy photons, including gamma rays and X-rays. All of these are capable of ionizing matter, either directly or indirectly, and all are, therefore, harmful to living tissue.

The damaging effect of radiation on living tissue depends upon the type and energy of the radiation and the radiation energy absorbed per unit mass of tissue. For example, if a person were exposed to a high energy electron radiation for a certain length of time, his body might absorb 100 ergs per gram. If he were to absorb the same 100 ergs per gram in the same tissue from proton radiation, the biological damage would usually be greater, because protons usually ionize matter more densely along their path than do electrons. The damage from protons might be as much as ten times greater, depending upon the energy spectrum of the incident protons.

Using the standard terminology of radiation dosimetry, this may be expressed as follows:

Let B be the biological dose, measured in units called rems.
Let J be the energy absorbed per gram of tissue, measured in units called rads. One rad is equal to 100 ergs per gram.
The ratio of B to J is called the relative biological effectiveness, or RBE, so that B equals J times RBE.

The value of the RBE may vary with the type of radiation, the radiation energy, the kind and degree of biological effect, the type of cell or tissue, the time distribution of the dose, temperature, oxygen tension, and many other factors. For radiation protection purposes, however, RBE values for whole-body irradiation of humans are usually assigned on a basis of linear energy transfer, which may be designated as $s$. This is the energy loss by an ionizing particle per unit length of path in an absorber. Linear energy transfer can be expressed in various units, such as ergs per centimeter, kev. per micron, or mev. per gram-centimeter$^{-2}$. Since it takes a definite amount of energy to create one ion pair, $s$ is proportional to the specific ionization; that is, the number of ions formed per unit length along the path of the particle.

For electrons and photons of energy up to above 100 mev., the RBE can be taken as equal to one. For protons, however, the RBE depends upon the proton energy. The best radiation monitoring instruments previously available measure rads; that is, they read correctly only when the RBE equals one. Of course, the instrument reading can be multiplied by the proper RBE when measuring a known type and energy spectrum of radiation. However, no previous available instrument can correctly measure biological dose in rems in an unknown mixture of radiations of different RBE values.

It is, accordingly, an object of this invention to provide an improved radiation detection device.

It is another object of this invention to provide an improved radiation detection device which will measure the biological effect of radiation.

It is another object of this invention to provide an improved radiation detection device which will measure the biological effect of mixed radiation of different types and different energy levels.

Briefly stated, and in accordance with one aspect of the invention, a radiation sensory element is provided which is a linear detector; that is, one whose electrical output is directly proportional to the rate of radiation energy dissipation in the detector. Radiation arriving at the detector will not be continuous, but will be particle by particle. The detector output, examined in detail, consists of a series of electrical pulses occurring at random times. If the radiation is sufficiently intense, the pulses overlap and pile up until individual pulses are not discernible. Nevertheless, the output is still not smooth, but has what may be termed an alternating current (A.C.) component. In accordance with the invention, this A.C. component is isolated and the average squared value of this A.C. component is measured in any suitable manner. For example, the power output of the A.C. component would be a measure of this average squared value. This average squared value of the A.C. component will then be a measure of the biological dose of the radiation impinging upon the detector and thus will be a measure of the dosage rate in rems.

For a more complete understanding of the invention, reference may be had to the following drawing, in which:

FIG. 1 shows, in block diagram, a radiation detector according to the invention which will measure the biological dose of radiation;

FIG. 2 shows, in block diagram form, a specific embodiment of the invention; and FIG. 3 shows a linear radiation sensing element which may be used with the invention.

With reference to FIG. 1, therein is shown, in block diagram form, a radiation measuring device in accordance with the invention. The device includes a linear radiation sensing or detector element 10. To show what is meant by a linear radiation detector element, presume that a first sequence of single ionizing events occurs during some time interval and causes the detector element to generate an electrical output signal which, as a function of the time $t$, would be written $I_1(t)$. This signal could be either a voltage or a current. Now presume that instead of the first sequence, a second sequence of single ionizing events occurs during the same time interval as the first sequence and causes the detector element to generate an electrical output signal which, as a function of the time $t$, would be written $I_2(t)$. Now presume that both the first and second sequences occur together. The linear radiation detector element is one in which the resulting output signal $I(t)$ of the radiation detector element is the sum of $I_1(t)$ and $I_2(t)$. Examples of such radiation detector elements are ionization chambers, proportional counters, scintillation detectors, or the like.

The radiation which arrives at the detector element 10 is not continuous but is instead particle by particle. The detector element output, examined in detail, consists of a series of electrical pulses occurring at random times. If the radiation is sufficiently intense, the pulses will overlap and pile up until individual pulses are not discernible. Nevertheless, the output is still not smooth, but has what may be termed an A.C. component. In accordance with the invention, this A.C. component is isolated and, as will be shown below, the average squared value of this A.C. component, which may be termed the power output of the A.C. component, is a measure of the biological dosage rate of the radiation arriving at the detector element 10.

To demonstrate this is so, assume that the detector element is a pancake-shaped ionization chamber of thickness $w$. Assume also, for the present, that the particles all arrive normal to the flat surface and pass through the chamber. Each individual particle will produce in the chamber a group of ions of total charge equal to $$q = sw \qquad (1)$$

where $s$ equals specific ionization of the radiation particles.

If the radiation flux density; that is, the particles arriving per centimeter$^2$—second, is F, the total charge Q collected in a time $t$ will be $$Q = FtAsw \qquad (2)$$

where A is the chamber area, or $$Q = FtVs \qquad (3)$$

where V is the chamber volume. The charge collected per unit volume will then be $$Q/V = Fts \qquad (4)$$

Since there is a direct relationship between ionization and absorbed energy, this relationship being about 32 electron volts per ion pair in air at standard temperature and pressure, $Q/V$ is proportional to the absorbed energy per unit volume and hence the absorbed energy per unit mass. The charge collected can thus be a direct measure of the absorbed dose in the detector, measured in rads. If the charge is collected continuously and the current $(Q/t)$ measured, the average current will be proportional to the dosage rate in rads per unit time; that is, D equals $J/t$, which is proportional to F$s$. It is in this manner that ionization chambers are conventionally utilized.

However, as has previously been explained, such a measurement will not be indicative of the biological dose received; that is, the does in rems, unless the RBE of the impinging radiation is equal to one. It will now be shown how the output of such a radiation sensing element may be used to obtain a biological dose reading.

Consider first the voltage output of the detector element from a single incident particle. The charge $q$ is typically collected very quickly, in a time less than the rise time of any pulse amplifier to which the detector element 10 may be connected. This will produce a voltage pulse which is of the general form $$v(t) = (q/C)e^{-t/RC} \qquad (5)$$

where C is the sum of the chamber capacitance, the wiring capacitance, and any amplifier input capacitance, and R is the amplifier input resistance.

In operation, of course, many such particles are arriving continuously, and if the radiation intensity is great enough, the pulses will overlap. As a result, at the higher intensities, individual pulses are not discernible, but instead the signal will contain what may be termed a D.C. component and an A.C. component. Its appearance on an oscilloscope, for example, will be like unto that of a "noisy" D.C. signal.

Whether or not the pulses overlap, the detector output can be related to the individual pulse shape and a pulse rate by the following expression:

$$\overline{v^2} = r \int_0^\infty v^2(t)\,dt + \left[ r \int_0^\infty v(t)\,dt \right]^2 \qquad (6)$$

where a $\overline{v^2}$ is the average squared voltage and $r$ is the average pulse rate.

This is known as Campbell's Theorem, being derived by N. R. Campbell and V. J. Francis, in J. Institute of Electrical Engineers 93 part III, 45 (1946).

The first term on the right hand side of the equation is the A.C. or "noise" component, and the second term is the D.C. component. If an amplifier having zero gain for D.C. is utilized, or if a blocking capacitor is inserted between the detector and the amplifier, then the D.C. component will vanish. The equation will then be $$\overline{v^2} = r \int_0^\infty v^2(t)\,dt \qquad (7)$$

Combining Equations 5 and 7 will yield the following equation:

$$\overline{v^2} = \frac{rq^2}{C^2} \int_0^\infty e^{-2t/RC}\,dt \qquad (8)$$

and, carrying out the indicated integration $$\overline{v^2} = rq^2R/2C \qquad (9)$$

Since $q$ equals $sw$, $$\overline{v^2} = \frac{Rw^2rs^2}{2B} \qquad (10)$$

Thus, the average squared voltage output for particles arriving at a rate $r$ with a specific ionization $s$ can be calculated. If there are mixed radiations such that there are $n$ classes of particles of different energy rates and different $s$ values, the generalized expression will then become $$\overline{v^2} = \frac{Rw^2}{2C}\left[ r_1s_1^2 + r_2s_2^2 + \cdots + r_ns_n^2 \right] \qquad (11)$$

where $r_1$ is the specific rate for particles of specific ionization $s_1$, and so on.

Now, since the absorbed energy dose rate D for each class of particle is proportional to $rs$, the following relationship will be true:

$$v^2 \alpha D_1s_1 + D_2s_2 + \cdots + D_ns_n \qquad (12)$$

Thus, it is shown that the average squared voltage of the A.C. component is proportional to the sum of the dose rates for the different classes of radiation weighted by the factor $s$ for each class.

Since it has been previously demonstrated that $$D = J/t \qquad (13)$$

and $$B = J(RBE) \qquad (14)$$

and since it is shown in the National Bureau of Standards Handbook 59, entitled, "Permissible Dose From External Sources of Ionizing Radiation," that over a considerable range of value, RBE is approximately proportional to $s$, then $$D\alpha B/st \qquad (15)$$

Combining Equations 12 and 15 will then yield $$v^2 \alpha (B_1 + B_2 + \cdots + B_n)/t \qquad (16)$$

It is thus seen that the mean squared voltage of the A.C. component of the output of a linear radiation detector element is proportional to the total biological dose, even in mixed fields of radiation.

Still referring to FIG. 1, the output of the linear detector element 10 is coupled through blocking capacitor 11, which removes any D.C. component, to the input of a preamplifier 12. High voltage from any suitable source may be connected through connection 13 and resistor 14. The output of preamplifier 12 may be further amplified by amplifier 15, whose output is applied to an average squared value detector 16, which may be termed a Campbell's Theorem detector. The detector 16 may include a scale 17 which will give the dosage rate directly in rems. The invention may thus be termed a rem meter. If it is desired to indicate the total dose received, any suitable integrating means 18 may be attached to the detector 16 to indicate the total dosage received.

Referring now to FIG. 2, therein is shown a specific embodiment of a radiation detector such as has been previously described.

The A.C. component of the output signal of a linear detector element 10 is applied to an amplifier 20, which may be a conventional transistorized linear A.C. amplifier, with a bandwith of the order of 100 kc. Since the input power may be as low as $10^{-15}$ watts, and the corresponding output power should be about $10^{-5}$ watts, the amplifier power gain should be about $10^{10}$. The dynamic range may cover at least three decades, with outputs ranging from $10^{-5}$ to $10^{-2}$ watts.

Within the broken line is shown an average squared value detector 21. Therein, the amplifier 20 supplies current to a resistive load 22, mounted in such a manner that its temperature is a fairly sensitive function of the power dissipation in a load 22. The temperature of amplifier load 22 is measured by a thermistor 23.

A relaxation oscillator 24 applies output pulses to an oscillator load 25 which is identical to amplifier load 22. The temperature of oscillator load 25 is measured by thermistor 26. Differential control 27 controls the frequency of oscillator 24 in such a manner that the oscillator load power is kept equal to the amplifier load power.

Since the output pulses of oscillator 24 all have the same shape and size, the oscillator frequency will be directly proportional to the oscillator load power, and hence to the amplifier load power. Thus, this pulse frequency will be proportional to the dose rate in rems being received by the detector 10, and is thus a measure of a biological dose of such radiation.

The dose rate can be measured by a frequency meter 28, which may control any standard meter 29, which will give a direct reading of the received radiation in rems. At the same time, the total integrated dose can be tabulated with a scaler circuit 30, the digital output of which may be continuously displayed on a register 31.

If the detector is being utilized in a remote location, such as a space vehicle, the oscillator frequency can be telemetered directly to a ground or control station by any suitable transmitting means 32. The ground stations could be equipped with duplicate frequency meters and scalers to display the dose rate and total dose.

FIG. 3 shows a linear sensing element which may be used with the invention. Therein is shown a cylindrical proportional counter 33 which may be about one inch long and one inch in diameter. The cylindrical wall 34 may be formed from any suitable material, such as aluminum, and may have a thickness of about 0.005 inch. A wire 35 is provided along the axis of the proportional counter 33 which is insulated from the cylindrical wall 34 by insulating members 36. The wire 35 may be formed from stainless steel and may have a diameter of about 0.001 inch. The proportional counter 33 may be filled with any suitable gas, such as a mixture of 90% argon and 10% carbon dioxide to a total pressure of about ten centimeters of mercury. A suitable high voltage may be maintained between the members 34 and 35 in any suitable manner.

While the invention is thus described and a specific embodiment disclosed, the invention is obviously not limited to this specific embodiment. Instead, many modifications will be apparent to those skilled in the art which will lie within the spirit and scope of the invention. For example, any suitable linear radiation sensing element may be used with the invention. Also, any suitable circuit means may be used to isolate the A.C. component of the output signal of the radiation sensing element and any suitable circuitry means may be utilized to measure the average squared value of this A.C. component. It is thus intended that the invention be limited in scope only by the appended claims.

What we claim as new and desire to secure by Letters Patent of the United States is:

1. A rem meter for indicating the biological effect of impinging ionizing radiation particles which may include simultaneously any combination of protons, electrons, alpha particles, neutrons, and high energy photons comprising a linear radiation detector element generating output pulses, said output pulses being proportional to the specific ionization of impinging radiation particles, and curcuit means connected to the output of said element to indicate the average squared value of the alternating current component of said output pulses, said value being approximately proportional to the rem dosage received by said linear radiation detector element.

2. A radiation measuring device responsive to indicate the biological effect of measured radiation which may include simultaneously any combination of protons, electrons, alpha particles, neutrons, and high energy photons comprising a linear radiation detector element responsive to impinging radiation and providing an output comprising a series of pulses proportional to the energy loss by an ionizing particle per unit length of path in an absorber, means for separating the alternating current component of said pulses, and circuit means to indicate the average squared value of said alternating current component in terms of biological effect.

3. In combination, a linear radiation detector element having a chamber of small dimensions to effect a measure of the specific ionization of impinging radiation particles, output of said element comprising a series of pulses proportional to linear energy transfer of radiation which may include simultaneously any combination of protons, electrons, alpha particles, neutrons, and high energy photons impinging thereupon, and circuit means responsive to the average squared value of the alternating current component of said pulses for indicating the effect of the impinging radiation upon living tissue.

4. A radiation measuring device to indicate the biological effect of measured radiation which may include simultaneously any combination of protons, electrons, alpha particles, neutrons, and high energy photons comprising a linear radiation detector element comprising a cylindrical element having dimensions of one inch in length, one inch in diameter and a wall thickness of approximately 0.005 inch for generating output pulses proportional to the energy loss by an ionizing particle per unit length of path in an absorber in response to radiation impinging thereupon, means for isolating the alternating current component of said pulses, and circuit means to indicate the average squared value of said alternating current component in terms of biological effect, said circuit means being responsive to the power level of said alternating current component.

5. A radiation measuring device comprising a linear radiation detector element for generating output pulses responsive to radiation impinging thereupon, the output of said detector having an alternating current component, means for isolating said alternating current component, circuit means responsive to the power level of said component, an oscillator having output pulses of constant shape whereby the output power of said oscillator is dependent upon the frequency thereof, means for controlling the frequency of said oscillator in such a manner as to maintain the power output of said oscillator in constant relation to the power level of said component, and means for measuring the frequency of said oscillator in terms of the biological effect of the radiation impinging upon said linear detector element.

6. A radiation measuring device comprising a linear radiation detector element for generating output pulses responsive to radiation impinging thereupon, said output pulses having an alternating current component, means for isolating said component, an amplifier for amplifying said component, an oscillator having output pulses of constant shape whereby the output power of said oscillator is dependent upon the frequency of said oscillator, means for maintaining the output power of said oscillator equal to the output power of said amplifier, and means for measuring the frequency of said oscillator in terms of the biological dose of the radiation impinging upon said linear radiation detector element.

7. A radiation measuring device comprising a linear radiation detector element for generating output pulses responsive to radiation impinging thereupon, said output pulses having an alternating current component, means for isolating said component of said output pulses, an amplifier for amplifying said component, a first resistive load whose temperature is responsive to the power output of said amplifier, means connecting said load to the output of said amplifier, an oscillator having output pulses of constant shape whereby the power output of said oscillator is responsive to the frequency thereof, a second resistive load whose temperature is responsive to the power output of said oscillator, means connecting said second load to the output of said oscillator, differential control means responsive to the temperature of said first and second resistive loads for controlling the frequency of said oscillator in such a manner to maintain the power output of said oscillator equal to the power output of said amplifier, and means for measuring the frequency of said oscillator in terms of the biological dose of the radiation impinging upon said linear detector element.

References Cited by the Examiner

UNITED STATES PATENTS

| | | | |
|---|---|---|---|
| 2,495,072 | 1/1950 | Molloy | 250—83.6 |
| 2,506,435 | 5/1950 | Rossi et al. | 250—83.6 |
| 2,516,334 | 7/1950 | Neufeld | 250—83.6 |
| 2,531,804 | 11/1950 | Carlin et al. | 250—83.6 |
| 2,609,512 | 9/1952 | Conviser | 250—83.6 |
| 2,676,268 | 4/1954 | Schorr | 250—83.6 |
| 2,874,305 | 2/1959 | Wilson et al. | 250—83.6 |
| 2,903,591 | 9/1959 | Lichtenstein | 250—83.6 |
| 2,968,731 | 1/1961 | Davis et al. | 250—83.6 |
| 2,974,248 | 3/1961 | Auxier et al. | 313—93 |
| 3,015,031 | 12/1961 | Dilworth et al. | 250—83.6 |
| 3,019,339 | 1/1962 | Wesley | 250—83.6 |
| 3,022,424 | 2/1962 | Anton | 250—83.6 |
| 3,052,797 | 9/1962 | Kronenberg | 313—93 X |

RALPH G. NILSON, *Primary Examiner.*

ARCHIE R. BORCHELT, *Examiner.*